US008671085B2

(12) United States Patent
Dhamankar et al.

(10) Patent No.: US 8,671,085 B2
(45) Date of Patent: Mar. 11, 2014

(54) CONSISTENT DATABASE RECOVERY ACROSS CONSTITUENT SEGMENTS

(75) Inventors: Robin Dhananjay Dhamankar, Bellevue, WA (US); Kapil Gupta, Redmond, WA (US); Michael Purtell, Maple Valley, WA (US); Kevin G. Farlee, Maple Valley, WA (US)

(73) Assignee: Microsoft Corporation, Redmond, WA (US)

( * ) Notice: Subject to any disclaimer, the term of this patent is extended or adjusted under 35 U.S.C. 154(b) by 84 days.

(21) Appl. No.: 13/315,363

(22) Filed: Dec. 9, 2011

(65) Prior Publication Data

US 2013/0151494 A1 Jun. 13, 2013

(51) Int. Cl.
*G06F 17/00* (2006.01)

(52) U.S. Cl.
USPC ............................................. 707/703

(58) Field of Classification Search
USPC ........................................ 707/687, 703; 711/4
See application file for complete search history.

(56) References Cited

U.S. PATENT DOCUMENTS

| 5,862,318 | A | 1/1999 | Habben |
| 6,047,294 | A * | 4/2000 | Deshayes et al. ............... 1/1 |
| 6,434,555 | B1 | 8/2002 | Frolund et al. |
| 6,449,623 | B1 | 9/2002 | Bohannon et al. |
| 7,072,912 | B1 | 7/2006 | Verma et al. |
| 7,277,905 | B2 | 10/2007 | Randal et al. |
| 7,475,099 | B2 * | 1/2009 | Doatmas et al. ............... 1/1 |
| 7,634,511 | B1 * | 12/2009 | Freiheit et al. ............... 1/1 |
| 7,779,298 | B2 | 8/2010 | Challenger et al. |
| 7,953,707 | B2 | 5/2011 | Hamel et al. |
| 2002/0144006 | A1 | 10/2002 | Cranston et al. |
| 2003/0093737 | A1 | 5/2003 | Purtell et al. |
| 2004/0107125 | A1 * | 6/2004 | Guheen et al. ............... 705/7 |
| 2005/0193247 | A1 * | 9/2005 | Doatmas et al. ............... 714/13 |
| 2006/0150200 | A1 | 7/2006 | Cohen et al. |
| 2006/0190469 | A1 | 8/2006 | Kathuria et al. |
| 2006/0224689 | A1 | 10/2006 | Leip et al. |

(Continued)

OTHER PUBLICATIONS

Haerder, et al., "Principles of Transaction-Oriented Database Recovery", Retrieved at <<http://citeseerxist.psu.edu/viewdoc/download-?doi=10.1.1.87.2812&rep=rep1&type=pdf>>, Computing Surveys (CSUR), vol. 15, No. 4, Dec. 1983, pp. 287-317.

(Continued)

*Primary Examiner* — Pierre Vital
*Assistant Examiner* — Courtney Harmon
(74) *Attorney, Agent, or Firm* — Nicholas Chen; Kate Drakos; Micky Minhas (57) ABSTRACT

A distributed database transaction coordination manager's outcome store may be unavailable to resolve in-doubt transactions locally, e.g., after an unclean detach, during an outcomes store restore, or during a logical database restore. To facilitate transactional consistency, AGEs and values based on them are used. Some code avoids reformatting any closed physical portion for reuse based on the segment's most recently received minimum of persisted AGEs. Some code commits any in-doubt transactions that appear on an aggregate list and aborts any not on the aggregate list. Some code writes each segment's transaction commit records to persistent storage until the segment's persisted-AGE is not less than a common-restore-AGE, and some code resolves any in-doubt transactions based on a harvested outcomes list. Outcomes may reside in a log or a persisted transactions table. A restore checkpoint may include harvested outcomes. Segments may reside on cloud nodes and/or in a shared nothing database system.

20 Claims, 3 Drawing Sheets

(56) References Cited

U.S. PATENT DOCUMENTS

| | | |
|---|---|---|
| 2006/0235847 A1 | 10/2006 | Farlee et al. |
| 2006/0235907 A1 | 10/2006 | Kathuria et al. |
| 2006/0265434 A1 | 11/2006 | Kathuria et al. |
| 2006/0282434 A1* | 12/2006 | Einamo .......................... 707/10 |
| 2006/0282478 A1 | 12/2006 | Purtell et al. |
| 2007/0038650 A1 | 2/2007 | Carley et al. |
| 2007/0239736 A1 | 10/2007 | Groff et al. |
| 2007/0294412 A1 | 12/2007 | Cargille et al. |
| 2008/0065637 A1 | 3/2008 | Farlee et al. |
| 2008/0065663 A1 | 3/2008 | Farlee et al. |
| 2008/0120470 A1 | 5/2008 | Dhamankar et al. |
| 2008/0196029 A1 | 8/2008 | Doty et al. |
| 2009/0228429 A1 | 9/2009 | Diaconu et al. |
| 2009/0234880 A1 | 9/2009 | Madhavarapu et al. |
| 2009/0260011 A1 | 10/2009 | Snover et al. |
| 2010/0094807 A1 | 4/2010 | Farlee et al. |
| 2010/0257138 A1 | 10/2010 | Wang et al. |
| 2010/0274980 A1 | 10/2010 | Stringham |
| 2011/0145201 A1 | 6/2011 | Holst et al. |
| 2011/0153674 A1 | 6/2011 | East et al. |
| 2011/0251997 A1 | 10/2011 | Wang et al. |
| 2012/0054245 A1* | 3/2012 | Colle et al. .................... 707/792 |

OTHER PUBLICATIONS

"Algorithms for Recovery and Isolation Exploiting Semantics", Retrieved at <<http://en.wikipedia.org/wiki/Algorithms_for_Recovery_and_Isolation_Exploiting_Semantics>>, pp. 3, Oct. 15, 2011.

J. Nicholas Hoover, "Microsoft Plans Internet Scaling With MatrixDB for SQL Server After 2008", Retrieved at <<http://www.informationweek.com/news/hardware/windows_servers/207400585>>, pp. 4, Apr. 18, 2008.

"Shared nothing architecture", Retrieved at <<http://en.wikipedia.org/wiki/Shared_nothing_architecture>>, pp. 2, Oct. 18, 2011.

"Transaction Log Physical Architecture", Retrieved at <<http://msdn.microsoft.com/en-us/library/ms179355.aspx>>, pp. 3, Jan. 12, 2011.

* cited by examiner

CONSISTENT DATABASE RECOVERY ACROSS CONSTITUENT SEGMENTS

BACKGROUND

In a database, a transaction may involve one or more records, tables, files, indexes, and/or other components of a database system. In practice, multiple operations on multiple components are often part of a given transaction, even though the transaction is presented to users as a single unitary ("atomic") action. If problems are encountered during the transaction, the database may be left in an inconsistent state. For example, the transaction may have been partially but not fully performed on the various components it involves, so that some have been updated but others have not. Such inconsistency can lead to inaccurate data, loss of data, and other problems. A wide variety of approaches have been developed to prevent and detect inconsistencies, and recover a database to a consistent state.

SUMMARY

In a distributed database, transactional consistency is often recovered after an error by using a single authoritative store, such as a transaction coordination manager's transaction outcome store, to resolve in-doubt transactions locally. But in some scenarios the transaction coordination manager's outcome store is not available. Such scenarios may arise, for example, after an unclean detach followed by an attach after an outcome store has forgotten transaction outcomes that may be needed to recover the database being attached, during a master database restore when an outcome store is corrupt and must be restored to a past point in time, or during a restore of a database into a different transaction outcome store context.

However, some embodiments facilitate database recovery in contexts that lack a suitable transaction coordination manager's outcome store one would otherwise use for recovery. In some embodiments, database software instances (a.k.a. "bricks") collectively host multiple segments of a logical database. A given brick may host one or more segments of one or more databases by providing the segment(s) with services such as a storage service, an operating system service, and/or an archival service. Each database software instance receives a sequence of monotonically increasing numbers ("AGEs") which correspond to commitments of transactions of the logical database. Embodiments then rely on the AGEs by using them to achieve transactional consistency across at least two segments of the logical database. The AGEs may be used in contexts such as (i) an unclean detachment of the logical database followed by an attachment of the logical database, (ii) a restore of a portion of a master database which has recorded the existence and file locations of the logical database, and/or (iii) a restore of the logical database into the scope of a different transaction coordination manager's outcome store.

In some embodiments, AGEs are relied on to achieve transactional consistency in context (i) or in context (ii). For example, some embodiments persist AGEs in persistent memory for respective segments, and also calculate successive GPAs over time, with each "GPA" for a given time being the minimum of the persisted AGEs of the segments at that time. GPAs are sent to the database software instance(s), and persisted in persistent memory for respective segments. GPAs are not necessarily persisted immediately on receipt by an instance, and GPAs are not necessarily persisted at the same time for all segments.

After sending GPAs, some embodiments elect or otherwise designate one of the segments to serve as a controller. The controller obtains from the other segment(s) respective lists of transactions which have recorded locally at the other segment(s) as being committed. The controller sends the other segment(s) an aggregate list of committed transactions. Then each segment commits any in-doubt transactions that appear on the aggregate list, and aborts any in-doubt transactions that do not appear on the aggregate list, thereby providing transactional consistency across the segments.

After sending GPAs, some embodiments store segment transaction committal attempt outcomes in a transaction commit outcomes storage ("TCOS") using physical portions. The TCOS may include a segment transaction log or a segment persisted transactions table ("PTT"), for example. Segment TCOS records for a prior TCOS block generation ("TBG") period are persisted as a TBG value is advanced to a next TBG period. As each old physical portion is closed, a segment's TBG value at the time of closing is recorded as being that physical portion's closing-TBG. The embodiments then facilitate transactional consistency by avoiding reformatting a given closed physical portion for reuse when that closed physical portion's closing-TBG is not smaller than the segment's most recently received GPA.

In some embodiments, AGEs are relied on as part of a database backup, to achieve transactional consistency in context (iii), namely, a logical database restore. For example, some embodiments back up tabular data of a segment and note a then-current AGE as a segment-data-copy-complete-AGE. These embodiments also identify a segment-persisted-AGE, namely, an AGE for which all transaction commit records of this segment for this AGE or prior AGEs have been written to persistent storage in a local database segment, thereby avoiding reliance on the outcome store for resolving the transaction outcome. One segment is elected or otherwise designated to serve as a controller. The controller obtains from the other segment(s) their respective segment-data-copy-complete-AGEs, and then sends the other segment(s) a common-restore-AGE which is the maximum of the segment-data-copy-complete-AGEs. Transactional consistency is then facilitated (and in general achieved) by writing each segment's transaction commit records to persistent storage until the segment's segment-persisted-AGE is not less than common-restore-AGE.

In some embodiments, AGEs are relied on as part of a database restore, to achieve transactional consistency in a context (iii) that includes a logical database restore. For example, some embodiments elect or otherwise designate a segment to serve as a controller. The controller obtains respective archived common-restore-AGEs from the other segment(s), and verifies that all common-restore-AGEs have the same value. Each segment redoes logged transactions up to the common-restore-AGE, and creates a harvested outcomes list. The harvested outcomes list contains outcomes from log records that have a segment-persisted-AGE not greater than the common-restore-AGE. Any in-doubt transactions are resolved based on the harvested outcomes list.

Some embodiments include a distributed database system, with at least two computers. Each computer has at least one logical processor and also has at least one memory in operable communication with the logical processor(s). The computer(s) may include cloud node(s), e.g., a computer which is accessed over the Internet and is owned by an entity other than the database owner. At least one instance of database software resides in the memory of each computer and hosts at least one segment of a logical database. The distributed database computer system may be a shared nothing database system in which none of the segments share RAM memory or disk memory with another segment. A sequence of numbers (AGEs) which correspond to commitments of transactions of the logical database also reside in memory for each instance of database software. Computer code residing in memory will, upon execution, use the AGEs to achieve transactional consistency across at least two segments of the logical database in at least one of the three contexts (i), (ii), and (iii) noted above.

In some embodiments, the computer code includes at least one transaction coordination manager ("TCM"). For example, some embodiments include one TCM for the entire distributed database system. Some include multiple TCMs for the distributed database computer system, with each TCM managing a group of logical databases. Some embodiments include one TCM per logical database in the distributed database computer system.

In some embodiments, the computer code includes code which, upon execution, performs particular step(s) discussed above. For example, some code avoids reformatting any closed physical portion for reuse when that closed physical portion's closing-TBG is not smaller than the segment's most recently received GPA. Similarly, some code commits any in-doubt transactions that appear on an aggregate list and aborts any in-doubt transactions that do not appear on the aggregate list, as discussed above. Likewise, some code writes each segment's transaction commit records to persistent storage until the segment's segment-persisted-AGE is not less than common-restore-AGE, and some code resolves any in-doubt transactions based on a harvested outcomes list. In some embodiments, a restore checkpoint residing in memory includes at least one list of harvested outcomes.

The examples given are merely illustrative. This Summary is not intended to identify key features or essential features of the claimed subject matter, nor is it intended to be used to limit the scope of the claimed subject matter. Rather, this Summary is provided to introduce—in a simplified form—some concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

During runtime in some distributed database systems, a transaction coordination manager's transaction outcome store is considered the authoritative source of transaction outcomes. Individual recovery units use the transaction manager's outcome store to resolve in-doubt transactions. This helps ensure that all the recovery units (a.k.a. database fragments, database segments) honor the same outcome for any given transaction. However, in some scenarios the transaction manager may not be available to resolve transaction outcomes for recovering the database(s). Thus, in some scenarios transactional consistency is to be achieved without using the transaction manager.

For example, consider an unclean detach followed by an attach. If a database is detached on the source without recording outcomes for all the (potentially) in-doubt transactions in the individual transaction logs, then the database is said have been detached unclean or to have experienced a rude detach. When this detached database is re-attached to the same or a different system of distributed database(s), the transaction manager on the target of the attach may not be able to resolve the transaction outcomes. Two cases may be of particular interest. One case involves an attach to the same distributed database that the database was detached from, when the transaction manager's outcome store may have moved on and not retained all the outcomes for in-doubt transactions. Another case involves an attach to a different distributed database than the database was detached from, in which the transaction manager's outcome store never contained the transaction outcomes.

As another example, consider a restore recovery. When a database is restored, either to the same distributed database system or to a different one, the transaction manager on the target system normally does not have the information to recover all restored database recovery units to a transactionally consistent point.

As a third example, consider a master database restore, which for present purposes represents the general situation of the transaction manager's store being corrupt so it must be restored. If a master database is restored from a backup, some of the transaction manager's outcome store which is stored in the master may be lost. Recovery of databases following such a master restore may not be able to rely on the transaction manager to resolve transaction outcomes. In some cases, restoring the transaction store means effectively reverting it to a point in the past, so it will not contain the most recent transaction outcomes.

Some embodiments discussed herein reconcile transaction outcomes in the above scenarios to facilitate transactional consistency. Transactional consistency is normally to be achieved within a database, but not necessarily across databases. While cross-database transactional consistency may be an artifact of global AGE and/or other mechanisms within a running transparent scale-out database system described herein, it is not necessary in any particular embodiment unless expressly stated otherwise.

Some embodiments described herein may be viewed in a broader context. For instance, concepts such as transactional consistency, detachment, attachment, backup, restore, outcomes, lists, reconciliation, shared values, and logs may be relevant to a particular embodiment. However, it does not follow from the availability of a broad context that exclusive rights are being sought herein for abstract ideas; they are not. Rather, the present disclosure is focused on providing appropriately specific embodiments. Other media, systems, and methods involving transactional consistency, detachment, attachment, backup, restore, outcomes, lists, reconciliation, shared values, and/or logs are outside the present scope. Accordingly, vagueness and accompanying proof problems are also avoided under a proper understanding of the present disclosure.

Reference will now be made to exemplary embodiments such as those illustrated in the drawings, and specific language will be used herein to describe the same. But alterations and further modifications of the features illustrated herein, and additional applications of the principles illustrated herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage, in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise their right to their own lexicography. Terms may be defined, either explicitly or implicitly, here in the Detailed Description and/or elsewhere in the application file.

As used herein, a "computer system" may include, for example, one or more servers, motherboards, processing nodes, personal computers (portable or not), personal digital assistants, cell or mobile phones, other mobile devices having at least a processor and a memory, and/or other device(s) providing one or more processors controlled at least in part by instructions. The instructions may be in the form of firmware or other software in memory and/or specialized circuitry. In particular, although it may occur that many embodiments run on workstation or laptop computers, other embodiments may run on other computing devices, and any one or more such devices may be part of a given embodiment.

A "multithreaded" computer system is a computer system which supports multiple execution threads. The term "thread" should be understood to include any code capable of or subject to scheduling (and possibly to synchronization), and may also be known by another name, such as "task," "process," or "coroutine," for example. The threads may run in parallel, in sequence, or in a combination of parallel execution (e.g., multiprocessing) and sequential execution (e.g., time-sliced). Multithreaded environments have been designed in various configurations. Execution threads may run in parallel, or threads may be organized for parallel execution but actually take turns executing in sequence. Multithreading may be implemented, for example, by running different threads on different cores in a multiprocessing environment, by time-slicing different threads on a single processor core, or by some combination of time-sliced and multi-processor threading. Thread context switches may be initiated, for example, by a kernel's thread scheduler, by user-space signals, or by a combination of user-space and kernel operations. Threads may take turns operating on shared data, or each thread may operate on its own data, for example.

A "logical processor" or "processor" is a single independent hardware thread-processing unit, such as a core in a simultaneous multithreading implementation. As another example, a hyperthreaded quad core chip running two threads per core has eight logical processors. Processors may be general purpose, or they may be tailored for specific uses such as graphics processing, signal processing, floating-point arithmetic processing, encryption, I/O processing, and so on.

A "multiprocessor" computer system is a computer system which has multiple logical processors. Multiprocessor environments occur in various configurations. In a given configuration, all of the processors may be functionally equal, whereas in another configuration some processors may differ from other processors by virtue of having different hardware capabilities, different software assignments, or both. Depending on the configuration, processors may be tightly coupled to each other on a single bus, or they may be loosely coupled. In some configurations the processors share a central memory, in some they each have their own local memory, and in some configurations both shared and local memories are present.

"Kernels" include operating systems, hypervisors, virtual machines, BIOS code, and similar hardware interface software.

"Code" means processor instructions, data (which includes constants, variables, and data structures), or both instructions and data.

"Program" is used broadly herein, to include applications, kernels, drivers, interrupt handlers, libraries, and other code written by programmers (who are also referred to as developers).

"Automatically" means by use of automation (e.g., general purpose computing hardware configured by software for specific operations discussed herein), as opposed to without automation. In particular, steps performed "automatically" are not performed by hand on paper or in a person's mind; they are performed with a machine.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise beyond the scope of human performance alone. "Computational steps" are steps performed computationally. Neither "automatically" nor "computationally" necessarily means "immediately".

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

Throughout this document, use of the optional plural "(s)", "(es)", or "(ies)" means that one or more of the indicated feature is present. For example, "segment(s)" means "one or more segments" or equivalently "at least one segment".

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as aborting, achieving, advancing, aggregating, avoiding reformatting, backing up, calculating, closing, committing, creating, designating, electing, harvesting, hosting, identifying, logging, noting, obtaining, persisting, providing, receiving, recording, redoing, relying on, resolving, restoring, sending, storing, using, verifying, and/or writing (or aborts, aborted, achieves, achieved, etc.) with regard to a destination or other subject may involve intervening action such as forwarding, copying, uploading, downloading, encoding, decoding, compressing, decompressing, encrypting, decrypting, authenticating, invoking, and so on by some other party, yet still be understood as being performed directly by the party of interest.

Whenever reference is made to data or instructions, it is understood that these items configure a computer-readable memory and/or computer-readable storage medium, thereby transforming it to a particular article, as opposed to simply existing on paper, in a person's mind, or as a transitory signal on a wire, for example. Unless expressly stated otherwise in a claim, a claim does not cover a signal per se.

Operating Environments

Figure 1:
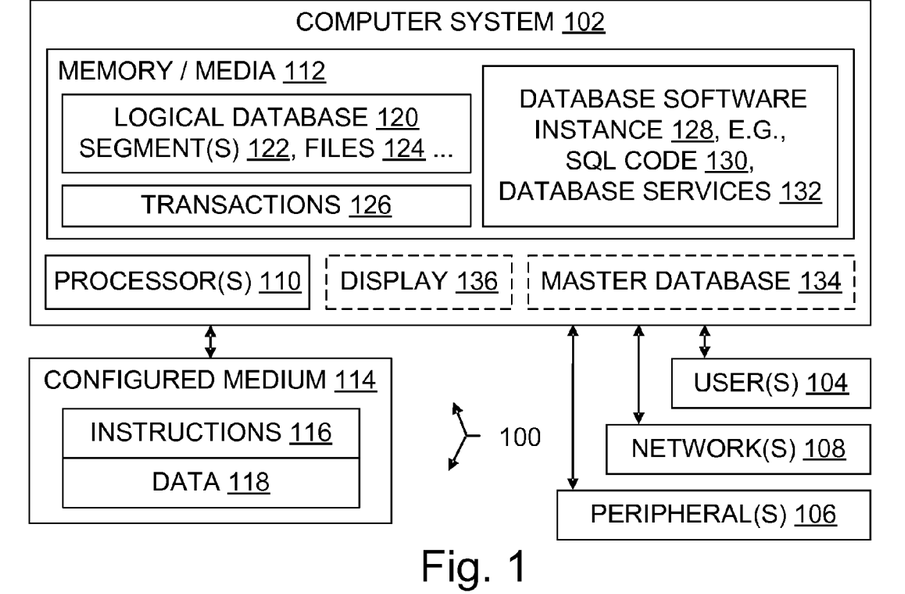
FIG. 1 is a block diagram illustrating a computer system having at least one processor, at least one memory, at least one logical database, and other items in an operating environment which may be present on multiple network nodes, and also illustrating configured storage medium embodiments.

With reference to FIG. 1, an operating environment 100 for an embodiment may include a computer system 102. The computer system 102 may be a multiprocessor computer system, or not. An operating environment may include one or more machines in a given computer system, which may be clustered, client-server networked, and/or peer-to-peer networked. An individual machine is a computer system, and a group of cooperating machines is also a computer system. A given computer system 102 may be configured for end-users, e.g., with applications, for administrators, as a server, as a distributed processing node, and/or in other ways.

Human users 104 may interact with the computer system 102 by using displays, keyboards, and other peripherals 106. System administrators, database administrators, developers, engineers, and end-users are each a particular type of user 104. Automated agents acting on behalf of one or more people may also be users 104. Storage devices and/or networking devices may be considered peripheral equipment in some embodiments. Other computer systems not shown in FIG. 1 may interact with the computer system 102 or with another system embodiment using one or more connections to a network 108 via network interface equipment, for example.

The computer system 102 includes at least one logical processor 110. The computer system 102, like other suitable systems, also includes one or more computer-readable storage media 112. Media 112 may be of different physical types. The media 112 may be volatile memory, non-volatile memory, fixed in place media, removable media, magnetic media, optical media, and/or of other types of media (as opposed to merely a signal). In particular, a configured medium 114 such as a CD, DVD, memory stick, or other removable non-volatile memory medium may become functionally part of the computer system when inserted or otherwise installed, making its content accessible for use by processor 110. The removable configured medium 114 is an example of a computer-readable storage medium 112. Some other examples of computer-readable storage media 112 include built-in RAM, ROM, hard disks, and other memory storage devices which are not readily removable by users 104. Unless expressly stated otherwise, neither a computer-readable medium nor a computer-readable memory includes a signal per se.

The medium 114 is configured with instructions 116 that are executable by a processor 110; "executable" is used in a broad sense herein to include machine code, interpretable code, and code that runs on a virtual machine, for example. The medium 114 is also configured with data 118 which is created, modified, referenced, and/or otherwise used by execution of the instructions 116. The instructions 116 and the data 118 configure the medium 114 in which they reside; when that memory is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by backup, restore, commits, aborts, reformatting, and/or other operations.

A logical database 120 with segments 122, files 124, transactions 126, and so forth, as well as database software instance(s) 128 with associated SQL or other query/backup/restore/interface code 130 and services 132, other software, a master database 134, and other items shown in the Figures and/or discussed in the text, may each reside partially or entirely within one or more media 112, thereby configuring those media. In addition to display(s) 136, an operating environment may also include other hardware, such as buses, power supplies, and accelerators, for instance.

One or more items are shown in outline form in FIG. 1 to emphasize that they are not necessarily part of the illustrated operating environment, but may interoperate with items in the operating environment as discussed herein. It does not follow that items not in outline form are necessarily required, in any Figure or any embodiment.

Systems

Figure 2:
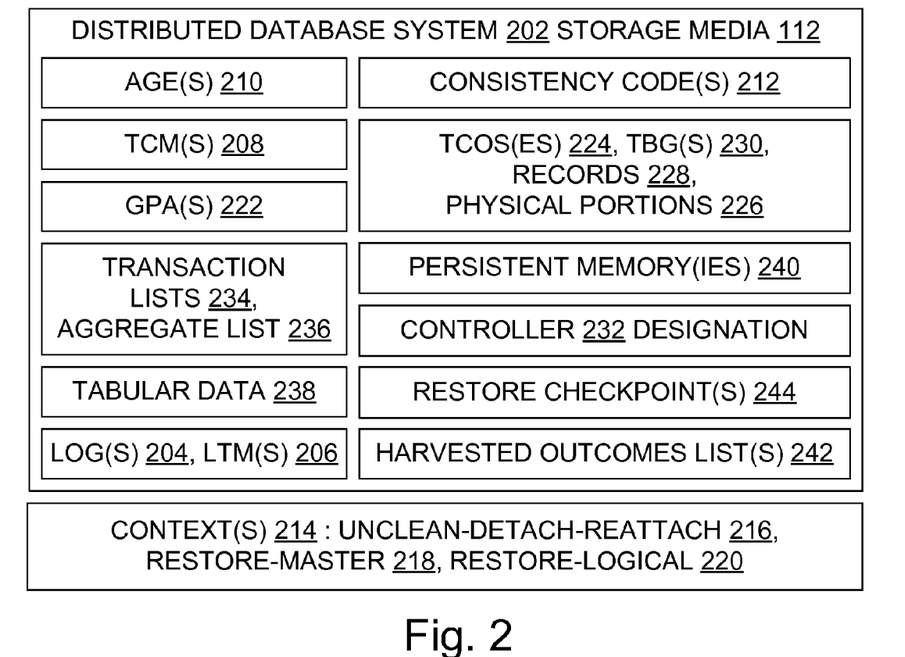
FIG. 2 is a block diagram illustrating aspects of consistent database recovery across constituent segments in an example architecture.
Figure 5:
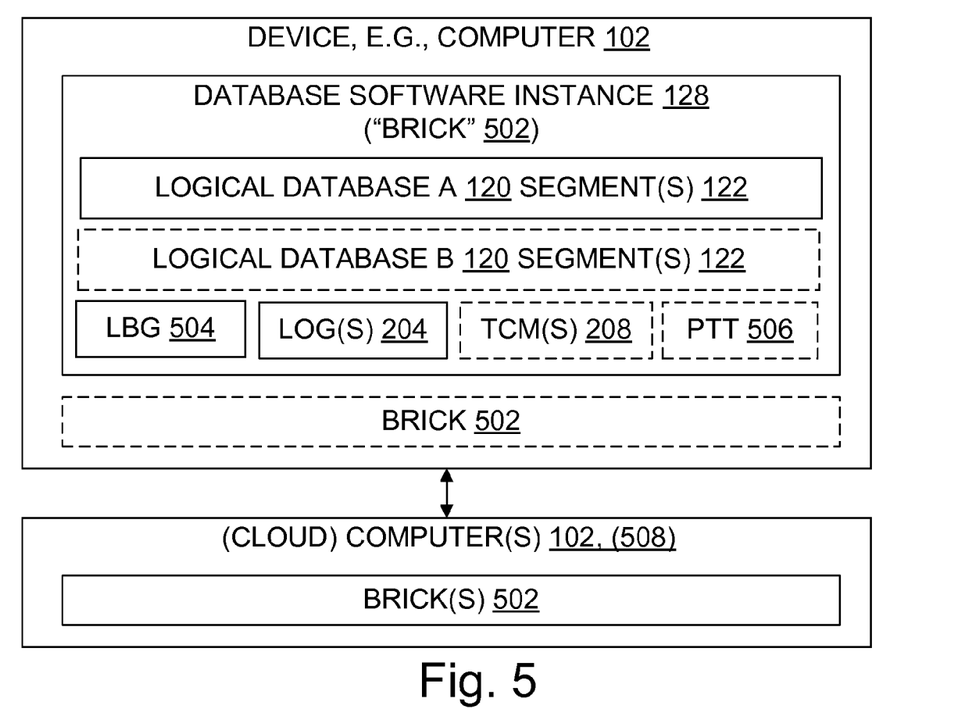
FIG. 5 is a block illustrating some suitable relationships between databases, database segments, database software instances, computers, and other items in an example architecture.

FIG. 2 illustrates an architecture which is suitable for use with some embodiments. A distributed database system 202 includes one or more logical databases 120 and two or more computers 102. Each logical database 120 is divided into multiple segments 122 that are hosted by instances 128 of database software. As also illustrated in FIG. 5, a given computer 102 in the distributed database system 202 may run one or more instances 128 of suitable database software, also referred to as bricks 502. A given instance of database software may host one or more segments 122 of a given logical database 120, and may host segment(s) 122 of one or more logical databases 120.

Figure 4:
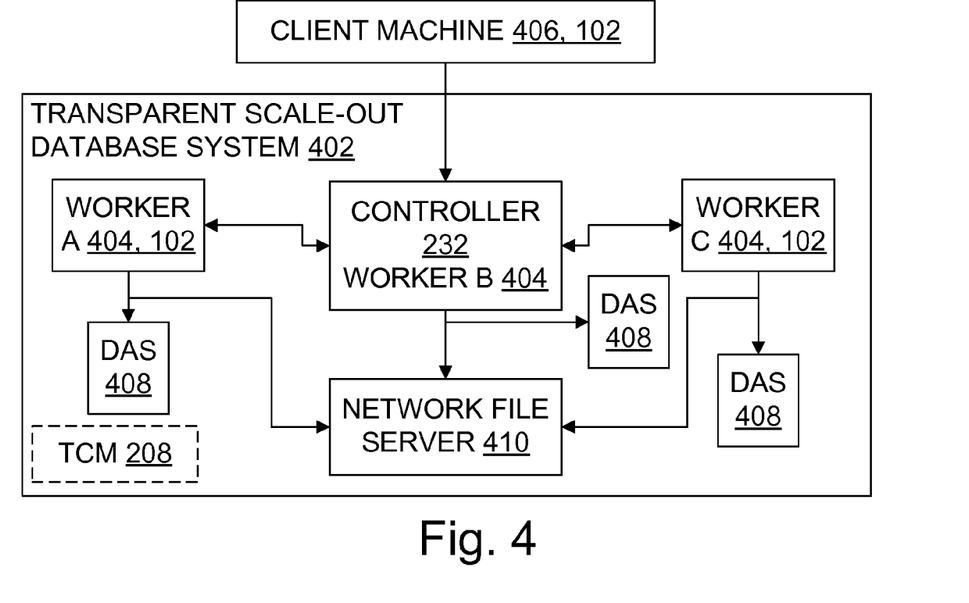
FIG. 4 is a data flow diagram illustrating backup/restore command processing in an example architecture.

In some embodiments, the computers 102 which host segments 122 are collectively referred to as a transparent scale-out database system (an example of which is sometimes referred to internally at Microsoft as a "matrix"). FIG. 4 illustrates one of many possible transparent scale-out database systems, denoted at 402. In some embodiments, a transparent scale-out database system is a scaled-out shared nothing database system 202, wherein a single user/logical database 120 is sub-divided into multiple physical database systems (segments) that can be hosted by independent database software instances 128, potentially on different machines/nodes 102. In some embodiments, a transparent scale-out database system transaction involves or has potential to involve more than one brick 502, and may also be called a cross-brick transaction. With transparent scale-out, the logical database is sub-divided into segments but the user can access the logical database as a single consistent unit from any of the database software instances in the system.

In some embodiments, a brick 502 is an instance of Microsoft® SQL Server® software that participates in the scale-out of a distributed database 120. In some, a segment 122 may not span multiple bricks, but a brick can potentially contain more than one segment of the same database 120. A database segment is sometimes called a "fragment".

In some embodiments, each instance 128 of database software has its own LBG 504. "LBG" is an acronym for Log Block Generation. Logs 204 can be maintained to preserve a history of transactions 126 and other activities. Log storage units are called "blocks"; log records are stored in blocks. In some embodiments, log blocks are stamped with a monotonically increasing Log Block Generation (LBG) 504 value. In some embodiments, LBG is instance-wide. That is, a single instance 128 (such as an instance of Microsoft® SQL Server® code 130, marks of Microsoft Corporation) can manage segments 122 from multiple databases 120, with each segment having an independent transaction log 204 which has its own independent log sequence numbers (LSNs). However, at a given point in time all the log blocks (regardless of their individual LSNs in their respective log streams) get an instance-wide LBG 504 assigned to them. Log Block Generation is used to track the progress of log flush (log persistence) actions. The LBG value for a brick 502 is advanced periodically, and log records in the prior LBG are persisted.

In some embodiments, each segment 122 has its own transaction log 204, its own Log Truncation Manager (LTM) 206, and possibly its own Persisted Transactions Table (PTT) 506. A PTT 506 stored in each database segment provides an alternative to the database segments log that is otherwise used to retain transaction outcomes by not truncating it until GPA advances. Some embodiments shown also include at least one Transaction Coordination Manager (TCM) 208. In terms of number and scope, an embodiment may have one TCM 208 per distributed database system 202 to manage all databases 120 in the distributed database system, or multiple TCMs 208 per distributed database system 202 with each TCM managing a group of databases 120, or one TCM per logical database 120. Regardless, the TCM 208 component(s) is/are generally responsible for co-ordinating consistent commit and abort decisions for distributed transactions spanning multiple database segments.

In some embodiments, a TCM 208 periodically commits a batch of outstanding transactions 126 and records these commit outcomes in its persistent store. Each batch of commit decisions broadcasted from the TCM is stamped with a monotonically increasing sequence number, referred to herein as an "AGE". The AGEs 210 act as a global clock, which is pushed out from TCM(s) to all bricks 502.

In some embodiments, each database segment 122 has a separate log stream—also referred to the local log stream. Unless otherwise indicated, "log" herein refers to a transaction log, although systems may well contain other types of logs, such as an error log. A Virtual Log File (aka VLF) is a familiar unit of management within the physical structure of the log 204.

In some embodiments peripherals 106 such as human user I/O devices (screen, keyboard, mouse, tablet, microphone, speaker, motion sensor, etc.) will be present in operable communication with one or more processors 110 and memory. However, an embodiment may also be deeply embedded in a system, such that no human user 104 interacts directly with the embodiment. Software processes may be users 104.

In some embodiments, the system includes multiple computers connected by a network. Networking interface equipment can provide access to networks 108, using components such as a packet-switched network interface card, a wireless transceiver, or a telephone network interface, for example, will be present in a computer system. However, an embodiment may also communicate through direct memory access, removable nonvolatile media, or other information storage-retrieval and/or transmission approaches, or an embodiment in a computer system may operate without communicating with other computer systems.

Some embodiments provide a distributed database computer system 102 with at least two computers/nodes 404 (which may themselves be a cluster or other system 102). Each computer 404 has at least one logical processor 110 and at least one memory 112 that is in operable communication with logical processor(s) 110. The memory medium 112 is configured by circuitry, firmware, and/or software to transform a database 120 and its associated components by utilizing AGEs and other items to facilitate consistent database recovery in particular contexts as described herein. At least one instance 128 of database software resides in the memory 112 of each computer 404 and hosts at least one segment 122 of a logical database 120. A sequence of numbers (AGEs 210) which correspond to commitments of transactions of the logical database also resides in memory 112 for each instance of database software.

Some embodiments also include computer code 212 residing in memory 112. Upon execution, some code 212 will use the AGEs 210 to achieve transactional consistency across at least two segments 122 of the logical database 120 in at least one of the following contexts 214: (i) (a.k.a. context 216) an unclean detachment of the logical database 120 followed by an attachment of the logical database 120, (ii) (a.k.a. context 218) a restore of a master database (per the generalization in third example above of a corrupt outcome store) 134 which has recorded the existence and file locations of the logical database 120, (iii) (a.k.a. context 220) a restore of the logical database.

In some embodiments, the distributed database computer system 202 is a shared nothing database system, in that none of the segments 122 share RAM memory 112 or disk memory 112 with another segment 122.

In some embodiments, a database owner owns the logical database 120, and at least one of the segments 122 resides in a cloud node 508, namely, a computer 102 which is accessed over the Internet and is owned by an entity other than the database owner.

In some embodiments, the computer code 212 includes at least one of the following: one TCM 208 for the entire distributed database computer system; multiple TCMs 208 for the distributed database computer system, with each TCM managing a group of logical databases; one TCM 208 per logical database in the distributed database computer system.

Some embodiments include code 212 which, upon execution, performs the following steps: persisting AGEs 210 in persistent memory 112 for respective segments 122; calculating successive GPAs 222 over time, each GPA 222 for a given time being the minimum of the persisted AGEs 210 of the segments 122 at that time; sending GPAs 222 to the database software instance(s) 128; persisting GPAs 222 in persistent memory 240, 112 for respective segments 122; storing segment transaction committal attempt outcomes in a transaction commit outcomes storage ("TCOS") 224 using physical portions 226; persisting segment TCOS records 228 for a prior TCOS block generation ("TBG") 230 period as a TBG value is advanced to a next TBG period; closing an old physical portion 226 and recording a segment's TBG 230 value at the time of closing as being that physical portion's closing-TBG; and avoiding reformatting any closed physical portion 226 for reuse when that closed physical portion's closing-TBG is not smaller than the segment's most recently received GPA 222.

Some embodiments include code 212 which, upon execution, performs the following steps: persisting AGEs 210 in persistent memory 240 for respective segments 122; calculating successive GPAs 222 over time, each GPA 222 for a given time being the minimum of the persisted AGEs 210 of the segments 122 at that time; sending GPAs 222 to the database software instance(s) 128; persisting GPAs 222 in persistent memory 112 for respective segments 122; designating a segment 122 to serve as a controller 232; obtaining at the controller 232 from other segment(s) 122 lists 234 of transactions 126 which have recorded locally at the other segment(s) as being committed; sending from the controller 232 to the other segment(s) 122 an aggregate list 236 of committed transactions 126; and each segment 122 committing any in-doubt transactions 126 that appear on the aggregate list 236 and aborting any in-doubt transactions 126 that do not appear on the aggregate list 236.

Some embodiments include code 212 which, upon execution, performs the following steps: backing up tabular data 238 of a segment 122 and noting a then-current AGE 210 as a segment-data-copy-complete-AGE; identifying as a segment-persisted-AGE an AGE 210 for which all transaction commit records of this segment for this AGE or prior AGEs have been written to persistent storage 240; designating a segment 122 to serve as a controller 232; obtaining at the controller 232 from other segment(s) 122 their respective segment-data-copy-complete-AGEs; sending from the controller 232 to the other segment(s) 122 a common-restore-AGE which is the maximum of the segment-data-copy-complete-AGEs; and writing each segment's transaction commit records 228 to persistent storage 240 until the segment's segment-persisted-AGE is not less than common-restore-AGE.

Some embodiments include code 212 which, upon execution, performs the following steps: designating a segment 122 to serve as a controller 232; obtaining at the controller 232 from other segment(s) 122 respective archived common-restore-AGEs 210; verifying at the controller 232 that all common-restore-AGEs have the same value; redoing logged transactions 126 at each segment 122 up to the common-restore-AGE; creating a harvested outcomes list 242 at each segment 122, the harvested outcomes list 242 containing outcomes from log records 228 having a segment-persisted-AGE not greater than the common-restore-AGE; and resolving any in-doubt transactions 126 based on the harvested outcomes list. Some embodiments include a restore checkpoint 244 residing in memory 112 and including at least one of the harvested outcomes lists 242. In the case of a restore, the harvested outcomes list can come from an archive in some embodiments.

Some embodiments operate in a "cloud" computing environment and/or a "cloud" storage environment in which computing services are not owned but are provided on demand. For example, segments 122 may be on multiple devices/systems 102 in a networked cloud, restore checkpoints 244 may be stored on yet other devices within the cloud, and the code(s) 212 may configure the display on yet other cloud device(s)/system(s) 102.

Processes

Figure 3:
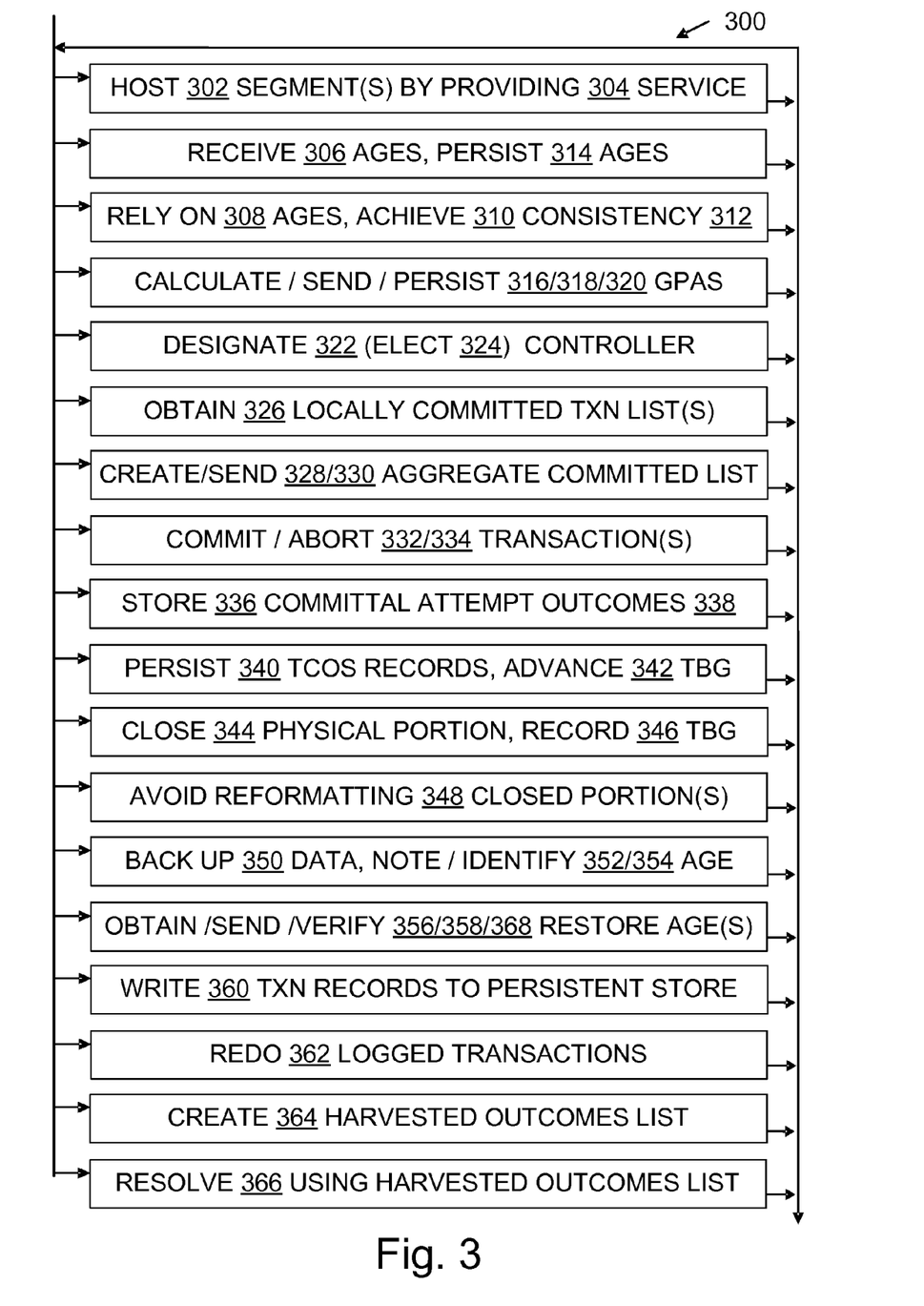
FIG. 3 is a flow chart illustrating steps of some process and configured storage medium embodiments.

FIG. 3 illustrates some process embodiments in a flowchart 300. Processes shown in the Figures may be performed in some embodiments automatically, e.g., by code 212 under control of a script or otherwise requiring little or no contemporaneous user input. Processes may also be performed in part automatically and in part manually unless otherwise indicated. In a given embodiment zero or more illustrated steps of a process may be repeated, perhaps with different parameters or data to operate on. Steps in an embodiment may also be done in a different order than the top-to-bottom order that is laid out in FIG. 3. Steps may be performed serially, in a partially overlapping manner, or fully in parallel. The order in which flowchart 300 is traversed to indicate the steps performed during a process may vary from one performance of the process to another performance of the process. The flowchart traversal order may also vary from one process embodiment to another process embodiment. Steps may also be omitted, combined, renamed, regrouped, or otherwise depart from the illustrated flow, provided that the process performed is operable and conforms to at least one claim.

Examples are provided herein to help illustrate aspects of the technology, but the examples given within this document do not describe all possible embodiments. Embodiments are not limited to the specific implementations, arrangements, displays, features, approaches, or scenarios provided herein. A given embodiment may include additional or different features, mechanisms, and/or data structures, for instance, and may otherwise depart from the examples provided herein.

Some embodiments provide a process for database recovery. The process includes hosting 302 multiple segments of a logical database with at least one database software instance 128 by providing 304 at least one of the following services 132 to the segments 122 through the database software instance(s): a storage service, an operating system service, an archival service. The process also includes receiving 306, at the database software instance(s), a sequence of monotonically increasing numbers ("AGEs") 210 which correspond to commitments of transactions of the logical database, and relying 308 on the AGEs to achieve 310 transactional consistency 312 across at least two segments of the logical database in a context 214. Suitable context vary by embodiment, but some of the examples include (i) (context 216) an unclean detachment of the logical database followed by an attachment of the logical database, (ii) (context 218) a restore of a master database which has recorded the existence and file locations of the logical database, and (iii) (context 220) a restore of the logical database.

In some embodiments, the relying step 308 achieves transactional consistency in context (i) or in context (ii), and the process further includes: persisting 314 AGEs in persistent memory 240 for respective segments; calculating 316 successive GPAs 222 over time; sending 318 GPAs to the database software instance(s); and persisting 320 GPAs in persistent memory for respective segments. Note that GPAs 222 are not necessarily persisted 320 immediately on receipt by an instance 128, and GPAs are not necessarily persisted 320 at the same time for all segments 122.

Some embodiments include designating 322 a segment to serve as a controller 232, e.g., by electing 324 a controller, by specifying a list of preferred controllers, by accepting user input, or by another designation mechanism. Some embodiments include obtaining 326 at the controller 232 segment from other segment(s) lists 234 of transactions which have recorded locally at the other segment(s) as being committed; creating 328 an aggregate list; and sending 330 the aggregate list 236 from the controller to the other segment(s). Some embodiments include each segment 122 committing 332 any in-doubt transactions that appear on the aggregate list 236 and aborting 334 any in-doubt transactions that do not appear on the aggregate list as none of the segments have committed the transaction so it should be safe to abort.

Some embodiments include storing 336 segment transaction committal attempt outcomes 338 in a transaction commit outcomes storage (TCOS) 224 using physical portions; persisting 340 segment TCOS records for a prior TCOS block generation (TBG 230) period as a TBG value is advanced to a next TBG period; closing 344 an old physical portion and recording 346 a segment's TBG value at the time of closing as being that physical portion's closing-TBG; and avoiding reformatting 348 any closed physical portion for reuse when that closed physical portion's closing-TBG is not smaller than the segment's most recently received GPA 222. In some embodiments, the storing step 336 stores segment outcomes 338 in the TCOS in a segment transaction log 204, and in some step 336 stores outcomes 338 in the TCOS in a segment persisted transactions table 506 which need not include other log information.

In some embodiments, the relying step 308 achieves transactional consistency in context (iii), and the process includes: backing up 350 tabular data of a segment 122 and noting 352 a then-current AGE 210 as a segment-data-copy-complete-AGE; identifying 354 as a segment-persisted-AGE an AGE for which all transaction commit records of this segment for this AGE or prior AGEs have been written to persistent storage 240; designating 322 a segment to serve as a controller 232; obtaining 356 at the controller from other segment(s) their respective segment-data-copy-complete-AGEs; sending 358 from the controller to the other segment(s) a common-restore-AGE which is the maximum of the segment-data-copy-complete-AGEs; and writing 360 each segment's transaction commit records to persistent storage until the segment's segment-persisted-AGE is not less than common-restore-AGE.

In some embodiments, the relying step 308 achieves transactional consistency in context (iii), and the process includes: designating 322 a segment to serve as a controller; obtaining 356 at the controller from other segment(s) respective archived common-restore-AGEs; verifying 368 at the controller that all common-restore-AGEs have the same value; redoing 362 logged transactions at each segment up to the common-restore-AGE; creating 364 a harvested outcomes list at each segment, the harvested outcomes list containing outcomes from log records having a segment-persisted-AGE not greater than the common-restore-AGE; and resolving 366 any in-doubt transactions based on the harvested outcomes list.

FIG. 4 further illustrates a process for backup/restore in some embodiments. A client machine 406 sends a backup command or a restore command to any brick 502 in a transparent scale-out database system 402. A controller 232 in the connect brick sends backup/restore protocol control commands to other bricks, using any of the protocols described herein, e.g., in the Process paragraphs above or in the Additional Examples section below. Each database segment's archive stream is written in parallel to digital attached storage 408 or to network file storage 410.

Configured Media

Some embodiments include a configured computer-readable storage medium 112. Medium 112 may include disks (magnetic, optical, or otherwise), RAM, EEPROMS or other ROMs, and/or other configurable memory, including in particular computer-readable media (as opposed to propagated signal media). The storage medium which is configured may be in particular a removable storage medium 114 such as a CD, DVD, or flash memory. A general-purpose memory, which may be removable or not, and may be volatile or not, can be configured into an embodiment using items such as code 212, AGEs 210, GPAs 222, aggregate lists 236, and harvested outcomes lists 242, in the form of data 118 and instructions 116, read from a removable medium 114 and/or another source such as a network connection, to form a configured medium. The configured medium 112 is capable of causing a computer system to perform process steps for transforming data through consistent database recovery facilitation and/or achievement as disclosed herein. FIGS. 1 through 5 thus help illustrate configured storage media embodiments and process embodiments, as well as system and process embodiments. In particular, any of the process steps illustrated in FIG. 3 or otherwise taught herein, may be used to help configure a storage medium to form a configured medium embodiment.

Additional Examples

Additional details and design considerations are provided below. As with the other examples herein, the features described may be used individually and/or in combination, or not at all, in a given embodiment.

Those of skill will understand that implementation details may pertain to specific code, such as specific APIs and specific sample programs, and thus need not appear in every embodiment. Those of skill will also understand that program identifiers and some other terminology used in discussing details are implementation-specific and thus need not pertain to every embodiment. Nonetheless, although they are not necessarily required to be present here, these details are provided because they may help some readers by providing context and/or may illustrate a few of the many possible implementations of the technology discussed herein.

Some embodiments are particularly helpful in achieving consistent database recovery. Assume that a distributed database system 202 commits successive batches of transactions 126 for a logical database 120. The logical database is divided into multiple segments 122 that are hosted by instances 128 of database software. In a first scenario, each time a batch of transactions is committed a new AGE 210 is generated by a transaction coordination manager (TCM) 208. The AGEs are a sequence of monotonically increasing numbers. The TCM 208 broadcasts each AGE to the instances of database software. The distributed database system relies 308 on the AGEs to achieve transactional consistency across the database segments in at least one of the following contexts 214: (i) an unclean detachment of the logical database followed by an attachment of the logical database, (ii) a restore of a master database which has recorded the existence and file locations of the logical database, (iii) a restore of the logical database.

A second scenario, which is an extension of scenario one, involves GPAs 222 for use in context (i) unclean detach then reattach, or in context (ii) master database restore. Each segment 122 has a persisted AGE, which is an AGE stored in persistent memory for the segment. The TCM 208 calculates successive GPAs over time. Each GPA for a given time is the minimum of the persisted AGEs of the segments at that time. The TCM successively broadcasts the GPAs to the instances of database software, and the GPAs received are subsequently persisted by the segments, although not necessarily immediately on receipt or at the same time in all segments.

A third scenario, which is an extension of scenario two, involves the use of GPAs 222 during a recovery reconciliation protocol. One segment is elected or otherwise designated 322 to be a controller 232. The controller tells the rest of the segments that this recovery will follow a reconciliation protocol. Each segment analyzes its local transaction log 204 (e.g., during an analysis phase of database recovery) and prepares a list 234 of transactions which are recorded there as committed and which have a commit AGE that is greater than the segment's persisted GPA. Each segment sends its list to the controller. The controller aggregates the lists by concatenating them and removing duplicate entries. The controller sends the aggregate list 236 to all the segments. Each segment has a set of in-doubt transactions 126, namely, transactions that have been prepared but not committed, at least as far as the segment knows. Different segments may have different transactions in-doubt. Each segment commits 332 its in-doubt transactions 126 that appear on the aggregate list and aborts 334 its in-doubt transactions that do not appear on the aggregate list.

A fourth scenario, which is another extension of scenario two, involves the use of GPAs 222 for log truncation. Each segment's transaction log is stored in physical portions 226 called VLFs. The VLFs are in a pool. Over time, old VLFs are closed 344, and their storage is subsequently reused by reformatting the closed VLFs to form new VLFs during log truncation. That is, the life cycle of a typical VLF includes the following states: closed (either done being used or never yet used), new (formatted and ready for use), in-use-but-not-yet-old, in-use-and-old. Each segment 122 has a monotonically increasing sequence of LBGs 504, which are used to track log flushing. As the LBG is advanced 342, log records for the prior LBG period are persisted. When an old VLF is closed 344, the segment's LBG at the time is recorded as that VLF's "VLFcloseLBG". Log truncation will not reformat 348 a closed VLF if the closed VLF's VLFcloseLBG is greater than or equal to the segment's most recently received GPA 222.

Scenarios may be combined. For example, a fifth scenario includes the combination of scenario one AGEs, scenario two GPAs for unclean detach then reattach or master database restore, scenario three GPAs during recovery reconciliation protocol, and scenario four use of GPAs for log truncation.

Sixth and seventh scenarios, each also an extension of scenario one, involve alternative storage locations for the transaction commit outcomes 338. In the sixth scenario, the transaction commit outcomes are kept in the segment transaction logs 204. In the seventh scenario, the transaction commit outcomes are kept instead in a Persisted Transactions Table (PTT 506) in each segment. Scenarios two, three, four, and five can be combined with either of scenarios six and seven. The transaction commit outcomes storage (TCOS 224) can be a segment's transactions log, a segment's PTT, or a combination of log and PTT.

An eighth scenario, also an extension of scenario one, involves use of AGEs in context (iii) for backup of the logical database 120. After all tabular data in a segment is backed up 350, the segment notes the current AGE 210, called the SegmentDataCopyCompleteAGE. One segment is elected or otherwise designated 322 to be the controller. Each segment 122 sends its respective SegmentDataCopyCompleteAGE to the controller. The controller 232 determines a CommonRestoreAGE which is the maximum of all the SegmentDataCopyCompleteAGEs, and sends 358 this CommonRestoreAGE to the other segments. Each segment has a PersistedAGE, which is the AGE for which all commit transaction records of this segment's log committed for this AGE or less have been written 360 to persistent storage 240. Each segment writes transaction log records to persistent storage until the segment's PersistedAGE>=CommonRestoreAGE.

A ninth scenario, also an extension of scenario one, involves use of AGEs in context (iii) for restore of the logical database 120. One segment is elected or otherwise designated to be the controller (not necessarily the same segment as for the backup). Each segment retrieves its CommonRestoreAGE from an archive of the segment, and sends that CommonRestoreAGE to the controller. The controller verifies 368 that all segments have the same value for CommonRestoreAGE and exits the protocol if they do not, with an error message to that effect. Each segment performs a redo 362 of the segment's transaction log up to the CommonRestoreAGE. Each segment prepares an in-doubt-list which contains all outcomes 338 that are in doubt (i.e., prepared to commit but not necessarily committed) in transaction log blocks whose PersistedAGE<=CommonRestoreAGE. Any in-doubt transactions are then resolved.

A tenth scenario combines the first, eighth, and ninth scenarios.

Discussion moves now from these scenarios to additional examples, which will be seen to share aspects with the scenarios but provide additional information as well.

By way of background, some familiar products provide a mechanism where "marks" may be placed in a transaction log across multiple databases and with respect to the same transaction, so that during a log restore all databases can be recovered to the same "mark" and be transactionally consistent. A drawback of this approach is that it only applies to restoring log backups. Also, these transactionally consistent points are declared by the application or user, and these points are the only points that can be restored in a transactionally consistent manner.

Some approaches described herein help ensure that there is enough information logged to each of the recovery units (segments) so that all recovery unit logs, in aggregate, contain enough information to determine the outcome of any in-doubt transactions for some transactional recovery point common to all recovery units. Some explicitly determine and record this common transactional recovery point in cases where it cannot be implicitly determined. Some help ensure that each recovery unit obtains the outcomes needed to resolve the in-doubt transactions it has for this common transactional recovery point in a way that is transactionally consistent with all other recovery units.

Some approaches presented herein include a change to transaction log truncation to ensure that there's enough information in the transaction logs of the recovery units to reach a transactionally consistent recovery across all of the recovery units. Some include the determination, during backup, of a common recovery point which all recovery units can recover to in a transactionally consistent manner.

Some approaches presented herein include gathering consensus information about the transaction outcomes so that all recovery units commit or abort each in-doubt transactions (for a given common recovery point) in the same way. For restore, this happens during a backup time when backup captures enough of the transaction log (which may including waiting for relevant transaction outcomes to be made durable) to correctly resolve in-doubt outcomes in a transactionally consistent manner across all recovery units during restore recovery. For an attach after unclean detach and database 120 recovery after restore of a master database, the gathering of all relevant outcomes happens during recovery when the relevant transactional outcomes from all recovery units are aggregated and used by all recovery units to determine consistent transaction resolution. This includes changes to the analysis pass or recovery to collect this information before it's aggregated. In short, in some embodiments database consistency can be achieved completely based on information contained in the database without also having a copy of the state of the transaction manager as of the common recovery point.

The following description is two parts. The first part addresses attachment of uncleanly detached databases 120 as well as recovery of user database after a master database (corrupt outcomes store) is restored. The second part addresses logical database 120 backup and restore.

Reconciliation of transaction outcomes is achieved through co-operation of individual recovery units (segments 122). Participating recovery units agree on the transaction outcomes for all the in-doubt transactions in the database and then each recovery unit applies the mutually agreed resolution for each transaction in doubt. If any one of the recovery units has committed a transaction then all the others agree to commit the transaction. Since individual fragments are on separate bricks that are making independent progress in processing transactions, the consistent resolution depends on each recovery unit remembering that it committed a transaction that some other fragment may still not have recorded a commit for. But it does not need to remember the commit event for a transaction if it knows for certain that all the participant recovery units would have already recorded the outcome. In some embodiments, the system has to ensure that any of the database segments records transaction has committed only when all other segments have prepared the transaction; "prepare" refers to the first phase of the two-phase commit protocol.

As to online processing, in some embodiments an AGE 210 is said to be persisted on a brick if the commit or abort outcomes for all transactions that committed or aborted in that AGE have been persisted in the individual log streams of the local fragments. Individual bricks track persistedAGE as the highest AGE that has been persisted on the brick.

As a response to an AGE message, every brick communicates its persistedAGE to the transaction manager. The persistedAGE value is per brick and not per database fragment. A TCM Manager (a TCM 208) also broadcasts a brick persistedAGE vector as a part of the periodic AGE broadcast. TCM Manager will also compute $$\text{Global Persisted AGE (GPA)} = \text{MIN [persistedAGE (i)]}$$

where persistedAGE (i) is the persistedAGE of the $i^{th}$ brick.

Individual Participating Recovery Units (PRUs) remember that they committed a transaction if the commitAGE>GPA. The PRUs can forget about any transaction that was committed at an AGE<=GPA.

Since transaction outcomes are retained in the log 204 (or other TCOS 224), using GPA 222 as an additional gate for log truncation helps ensure that all the outcomes that maybe required for reconciliation are preserved in the PRU log (or other TCOS). Although some discussion below refers to using the log to retain outcomes 338 for reconciliation, it is also possible in some embodiments to use the Persisted Transactions Table instead, as discussed in more detail below.

The GPA value is periodically persisted in the boot page of the individual data fragments. The next section describes how these persisted values are used. Note that this approach need not assume that for a given set of fragments that are recovering through this mechanism, the persisted GPA value will be consistent. GPA is a global value, so all segments of a database have a common GPA. However, distinction may be made between the in-volatile-memory value of the GPA and what gets recorded (in nonvolatile memory) in each segment. As GPA advances 342, different segments persist (store in nonvolatile memory) the effects of the new value of GPA independently.

As to reconciliation during recovery, in some embodiments recovery is coordinated by a single designated 322 brick (it can be the connect brick for the attach statement, for instance). The database manager on the coordinating brick will act as the controller 232.

Reconciliation is achieved as follows. The controller informs the rest of the bricks (TCM Agent on those bricks) that this recovery operation will follow the reconciliation protocol as opposed to consulting the transaction manager. During an Analysis Pass, each recovery unit analyzes the local log stream and computes the list of transactions that are recorded as committed and whose commit age is greater than the GPA persisted in the recovery unit's boot page.

Note that it is not always necessary for recovering fragments to agree on a value of the GPA, because of the following. First, the GPA is strictly monotonically increasing. Second, when a fragment records GPA locally during runtime everything up to this GPA value is guaranteed to be persisted by all the other fragments. If fragment DBF1 records the GPA as 10 while DBF2 records 11, this merely indicates that the fragment DBF2 did checkpoint more recently. It does not imply that DBF1 needs outcomes from age 11. DBF2 could not have recorded 11 as the GPA unless every brick including the one that hosts DBF1 has confirmed that they had persisted AGE 11. So although the GPA had advanced to 11, one of the fragments may not have recorded the updated value (its persistent state still shows GPA=10). However, delay in recording the GPA value doesn't imply that the segment needs any outcomes prior to the real GPA value (11 in this case).

The list of transactions that are recorded as committed and whose commit age is greater than the persisted GPA is sent to the controller at the end of the Analysis Pass. The fragment then continues with local Redo while the controller aggregates the list of transaction outcomes. Each fragment waits to receive the aggregate list 236 of transactions before it resolves in-doubt transactions. The controller aggregates the list of committed transactions it receives from each participating PRU to generate the aggregated list of transaction commit outcomes. The controller makes this aggregated list available to each worker (local recovery operation). The recovery proceeds by committing 332 an in-doubt transaction if it is included in the aggregate list and aborting 334 the transaction if it is not.

As to using GPA to gate log truncation, in some familiar approaches log truncation is completely driven by LSNs. Different LSNs are tracked in a log truncation manager and are used to determine the minimum LSN of interest. Periodically as truncation is performed, the virtual log files those are older than the one that has the MinLSN are reused. Observing that the unit of truncation is at the granularity of VLFs, one sees that some embodiments can thus use the following protocol to help ensure that log truncation preserves VLF(s) that have any transactions of interest.

When a new VLF is formatted and old one is closed, one records the LBG of the brick as of the time when the VLF filled up in the LFCB; call this the VLFCloseLBG. It will be recalled that the LFCB is an in-memory data structure that maintains information about an individual VLF (virtual log file). In case of a crash, VLFCloseLBG can be recovered during an initial log scan as the LBG in the last log block of the active virtual log file. Based on the relation between AGE and LBG, a transaction committed in AGE A will not have its transaction outcome recorded in LBG value<A. Therefore transaction outcomes recorded in $VLF_i$ are for transactions committed in AGE $VLFCloseLBG_i$ or less.

In Microsoft® SQL Server® (marks of Microsoft Corporation) implementations, SQLServerLogMgr::SetMinLSN (code which helps decide if a VLF can be truncated) will take into account both the MinLSN and the VLFCloseLBG before truncating any VLF. Accordingly, a VLF can be truncated only if fseqno<MinLSN.fseqNo and VLFCloseLBG<GPA. A truncation holdup computation is modified similarly to account for GPA as a holdup reason. Other vendor's implementations may be tailored similarly.

As to using a Persisted Transactions Table in place of the transaction log, it is known that a transaction log generally has much more than the commit outcomes for transactions. So retaining the entire transaction log to retain transaction outcomes may be inefficient. The persistent transactions table 506 on the other hand, in some embodiments, only has information about the transaction commits. Retaining the transaction outcomes in the persisted transaction table may thus be an alternative to keeping additional logs. PTT in a transparent scale-out database system 402 can be ordered by the AGE in which a transaction committed (i.e., AGE is the primary key) hence it can be extended to add GPA as a criterion for its cleanup.

As to protocols for Backup/Restore generally, in a transparent scale-out database system (TSODBS) 402 such protocols are distributed, and a TSODBS AGE can be used as a point of consistency. An AGE is different, in this context, from a distributed mark. For example, AGE is automatically placed in transparent scale-out database system DB Segment logs 204, and is placed at a relatively high rate.

During transparent scale-out database system backup, it may be desired to create a backup of each DB (database) segment in a database which has a common AGE that can be used to restore to a consistent point. The distributed restore with consistency is then a matter of restoring each DB segment backup to the same AGE. Another aspect of backup is to capture enough log past the common AGE to have all of the commit records that pertain to transactions that committed up to this common AGE. During restore the extra log is scanned for the needed outcomes for use during undo recovery.

As to Backup protocols specifically, some approaches use the following algorithmic process. Each worker 404 computes FirstLSN and does the tabular data copy as is done, e.g., in familiar Microsoft® SQL Server® implementations (marks of Microsoft Corporation). Each worker 404 will get the end of log LSN to update the log truncation manager when the backup completes. Each worker computes DbSegment-DataCopyCompleteAGE here and communicates that to the controller 232. The worker will capture the current AGE that the log records are being logged to. This will be the AGE that the LogMgr (Log Manager) is currently setting on each log block that log records are being written to. This AGE will be called the DbSegmentDataCopyCompleteAGE. Tabular data pages that were modified in an AGE less than or equal to this AGE may have been copied to the archive. The archive will not contain any data pages modified in an AGE greater than this value. DbSegmentDataCopyCompleteAGE is then communicated back to the controller 232.

Continuing, the controller 232 determines CommonRestoreAGE as the max of all DbSegmentDataCopyCompleteAGE values. Once the controller has collected the DbSegmentDataCopyCompleteAGE from all workers 404, it will calculate the CommonRestoreAGE by taking the maximum of all of the DbSegmentDataCopyCompleteAGE values. This CommonRestoreAGE is then returned to all of the workers for use in determining the range of log entries to copy to the archive. This process persists enough log to capture commit log records for transactions that committed in or before the CommonRestoreAGE. The worker waits until the flushed PersistedAGE is greater or equal to the CommonRestoreAGE. The PersistedAGE is the AGE for which all commit log records committed to this AGE or less have been written. The log copy portion of the backup will then proceed as it does, e.g., for standalone SQL versions using FirstLSN and LastLSN to determine the range of log to copy. LastLSN is captured as the current end of the flushed log. The process writes the CommonRestoreAGE to the archive trailing metadata.

In this process, the following LSN and AGE relationships hold for each worker 404:

```
FirstLSN <= BackupLSN <=
LsnOf(DbSegmentDataCopyCompleteAGE) <=
LsnOf(CommonRestoreAGE) <= LastLSN
```

As to Restore protocols specifically, some approaches use the following algorithmic process. Each worker 404 restores any tabular data present from the archive, and restores the log data present from the archive, as in familiar processes. Each worker retrieves the CommonRestoreAGE from the archive and sends that to the controller 232. The controller verifies 368 that all workers have the same value for CommonRestoreAGE. Each worker 404 performs redo 362 of the log up to the CommonRestoreAGE. StopLSN will be set to the last LSN that was redone. Each worker builds an outcomes list to use in resolving 366 in-doubt transactions for recovery at CommonRestoreAGE.

Once the redo engine gets to the termination point, it will continue to scan log records for any outcomes that are relevant for recovery at CommonRestoreAGE (as long as the log blocks have a PersistedAGE which is less than or equal to the targeted CommonRestoreAGE) and add these to a list that will be used to write the outcomes past the log snip point later in the restore process. In some implementations, this outcomes list is part of a BackupOperation object and will be included in the restore checkpoint 244 of the BackupOperation object so that the outcomes will still be available from a restore restart if a crash happens after the log has been snipped but before the outcomes have been appended to the log.

Continuing, the process does a restore checkpoint: OperationState: OfflineRedoOutcomesHarvested. This is an added restore state, introduced to deal with a crash that might happen anytime after the log is snipped but before all of the outcomes have been written to the log. This will persist the newly harvested outcomes into the restore restart checkpoint file for using during restore recovery. Then, a SnipEndOfLog will effectively set the point that redo stopped at as the new end of log. The process then executes restore recovery using harvested outcomes to resolve in-doubt transactions (rollback or commit). This differs from presume-abort processing, where all in-doubt transactions would be rolled back. At this point, the segments will be in a transactionally consistent state.

CONCLUSION

Although particular embodiments are expressly illustrated and described herein as processes, as configured media, or as systems, it will be appreciated that discussion of one type of embodiment also generally extends to other embodiment types. For instance, the descriptions of processes in connection with FIG. 3 also help describe configured media, and help describe the operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific features of an example may be omitted, renamed, grouped differently, repeated, instantiated in hardware and/or software differently, or be a mix of features appearing in two or more of the examples. Functionality shown at one location may also be provided at a different location in some embodiments.

Reference has been made to the figures throughout by reference numerals. Any apparent inconsistencies in the phrasing associated with a given reference numeral, in the figures or in the text, should be understood as simply broadening the scope of what is referenced by that numeral.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims and the abstract, as filed, are part of the specification.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific features or acts described above the claims. It is not necessary for every means or aspect identified in a given definition or example to be present or to be utilized in every embodiment. Rather, the specific features and acts described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A computer-readable storage medium configured with data and with instructions that when executed by at least one processor causes the processor(s) to perform a process for database recovery, the process comprising the steps of:
   hosting multiple segments of a logical database with at least one database software instance by providing at least one of the following services to the segments through the database software instance(s): a storage service, an operating system service, an archival service;
   receiving, at the database software instance(s), a sequence of monotonically increasing numbers ("AGEs") which correspond to commitments of transactions of the logical database;
   when a recovery context of the logical database includes (i) an unclean detachment of the logical database followed by an attachment of the logical database, or includes (ii) a restore of a master database corrupted outcomes store which has recorded the existence and file locations of the logical database, then persisting AGEs in persistent memory for respective segments, and relying on at least one of the persisted AGEs while achieving transactional consistency across at least two segments of the logical database; and
   when a recovery context of the logical database includes (iii) a restore of the logical database from a first transaction coordination manager's outcome store into a scope of a second transaction coordination manager's outcome store, then designating a segment to serve as a controller, and relying on at least one of the AGEs and the controller while achieving transactional consistency across at least two segments of the logical database.

2. The configured medium of claim 1, wherein the relying step achieves transactional consistency in context (i) or in context (ii), and the process further comprises:
   calculating successive GPAs over time, each GPA for a given time being the minimum of the persisted AGEs of the segments at that time;
   sending GPAs to the database software instance(s); and
   persisting GPAs in persistent memory for respective segments, wherein GPAs are not necessarily persisted immediately on receipt by an instance and GPAs are not necessarily persisted at the same time for all segments.

3. The configured medium of claim 2, wherein the process further comprises:
   designating a segment to serve as a controller;
   obtaining at the controller from other segment(s) lists of transactions which have recorded locally at the other segment(s) as being committed;
   sending from the controller to the other segment(s) an aggregate list of committed transactions; and
   each segment committing any in-doubt transactions that appear on the aggregate list and aborting any in-doubt transactions that do not appear on the aggregate list.

4. The configured medium of claim 2, wherein the process further comprises:
   storing segment transaction committal attempt outcomes in a transaction commit outcomes storage ("TCOS") using physical portions;
   persisting segment TCOS records for a prior TCOS block generation ("TBG") period as a TBG value is advanced to a next TBG period;
   closing an old physical portion and recording a segment's TBG value at the time of closing as being that physical portion's closing-TBG; and
   avoiding reformatting any closed physical portion for reuse when that closed physical portion's closing-TBG is not smaller than the segment's most recently received GPA.

5. The configured medium of claim 4, wherein the storing step comprises at least one of the following:
   storing segment transaction committal attempt outcomes in the TCOS in a segment transaction log;
   storing segment transaction committal attempt outcomes in the TCOS in a segment persisted transactions table.

6. The configured medium of claim 1, wherein the relying step achieves transactional consistency in context (iii), and the process further comprises:
   backing up tabular data of a segment and noting a then-current AGE as a segment-data-copy-complete-AGE;
   identifying as a segment-persisted-AGE an AGE for which all transaction commit records of this segment for this AGE or prior AGEs have been written to persistent storage;
   obtaining at the controller from other segment(s) their respective segment-data-copy-complete-AGEs;
   sending from the controller to the other segment(s) a common-restore-AGE which is the maximum of the segment-data-copy-complete-AGEs; and
   writing each segment's transaction commit records to persistent storage until the segment's segment-persisted-AGE is not less than common-restore-AGE.

7. The configured medium of claim 1, wherein the relying step achieves transactional consistency in context (iii), and the process further comprises:
   obtaining at the controller from other segment(s) respective archived common-restore-AGEs;
   verifying at the controller that all common-restore-AGEs have the same value;
   redoing logged transactions at each segment up to the common-restore-AGE;
   creating a harvested outcomes list at each segment, the harvested outcomes list containing outcomes from log records having a segment-persisted-AGE not greater than the common-restore-AGE; and
   resolving any in-doubt transactions based on the harvested outcomes list.

8. A process for consistent database recovery, the process executed by at least one processor, the process comprising the steps of: hosting multiple segments of a logical database with at least one database software instance by providing at least one of the following services to the segments through the database software instance(s): a storage service, an operating system service, an archival service;

receiving, at SQL database software instance(s), a sequence of numbers ("AGEs") which correspond to commitments of transactions of a logical database having segments hosted by the SQL database software instance(s); and     when a recovery context of the logical database includes (i) an unclean detachment of the logical database followed by an attachment of the logical database, or includes (ii) a restore of a master database corrupted outcomes store which has recorded the existence and file locations of the logical database, then persisting AGEs in persistent memory for respective segments, and relying on at least one of the persisted AGEs while achieving transactional consistency across at least two segments of the logical database; and     when a recovery context of the logical database includes (iii) a restore of the logical database from a first transaction coordination manager's outcome store into a scope of a second transaction coordination manager's outcome store, then designating a segment to serve as a controller, and relying on at least one of the AGEs and the controller while achieving transactional consistency across at least two segments of the logical database.

9. The process of claim 8, wherein the process further comprises:

calculating successive GPAs over time, each GPA for a given time being the minimum of the persisted AGEs of the segments at that time;

sending GPAs to the SQL database software instance(s); and     persisting GPAs in persistent memory for respective segments, wherein GPAs are not necessarily persisted immediately on receipt by an instance and GPAs are not necessarily persisted at the same time for all segments.

10. The process of claim 9, wherein the process further comprises:

storing segment transaction committal attempt outcomes in a transaction commit outcomes storage ("TCOS") using physical portions;

persisting segment TCOS records for a prior TCOs block generation ("TBG") period as a TBG value is advanced to a next TBG period;

closing an old physical portion and recording a segment's TBG value at the time of closing as being that physical portion's closing-TBG; and     avoiding reformatting any closed physical portion for reuse when that closed physical portion's closing-TBG is not smaller than the segment's most recently received GPA.

11. The process of claim 8, wherein the process further comprises:

obtaining at the controller from other segment(s) lists of transactions which have recorded locally at the other segment(s) as being committed;

sending from the controller to the other segment(s) an aggregate list of committed transactions; and     each segment committing any in-doubt transactions that appear on the aggregate list and aborting any in-doubt transactions that do not appear on the aggregate list.

12. A distributed database computer system comprising:

at least two computers, each computer having at least one logical processor and also having at least one memory in operable communication with logical processor(s);

at least one instance of database software residing in the memory of each computer and hosting at least one segment of a logical database;

a sequence of numbers ("AGEs") which correspond to commitments of transactions of the logical database and which reside in memory for each instance of database software; and     computer code residing in memory which, upon execution, will perform a process for consistent database recovery, the process comprising the steps of:

hosting multiple segments of the logical database with at least one database         software instance by providing at least one of the following services to the segments through the database software instance(s): a storage service, an operating system service, an archival service;

receiving the sequence of AGEs at the database software instance(s);

when a recovery context of the logical database includes (i) an unclean detachment of the logical database followed by an attachment of the logical database, or includes (ii) a restore of a master database corrupted outcomes store which has recorded the existence and file locations of the logical database, then persisting AGEs in persistent memory for respective segments, and relying on at least one of the persisted AGEs while achieving transactional consistency across at least two segments of the logical database; and     when a recovery context of the logical database includes (iii) a restore of the logical database from a first transaction coordination manager's outcome store into a scope of a second transaction coordination manager's outcome store, then designating a segment to serve as a controller, and relying on at least one of the AGEs and the controller while achieving transactional consistency across at least two segments of the logical database.

13. The system of claim 12, wherein the distributed database computer system is a shared nothing database system in that none of the segments share RAM memory or disk memory with another segment.

14. The system of claim 12, wherein a database owner owns the logical database, and at least one of the segments resides in a cloud node, namely, a computer which is accessed over the Internet and is owned by an entity other than the database owner.

15. The system of claim 12, wherein the computer code further comprises at least one of the following:

one transaction coordination manager ("TCM") for the entire distributed database computer system;

multiple TCMs for the distributed database computer system, with each TCM managing a group of logical databases;

one TCM per logical database in the distributed database computer system.

16. The system of claim 12, wherein the computer code includes code which, upon execution, performs the following steps:

persisting AGEs in persistent memory for respective segments;

calculating successive GPAs over time, each GPA for a given time being the minimum of the persisted AGEs of the segments at that time;

sending GPAs to the database software instance(s);

persisting GPAs in persistent memory for respective segments;

storing segment transaction committal attempt outcomes in a transaction commit outcomes storage ("TCOS") using physical portions;

persisting segment TCOS records for a prior TCOS block generation ("TBG") period as a TBG value is advanced to a next TBG period;

closing an old physical portion and recording a segment's TBG value at the time of closing as being that physical portion's closing-TBG; and avoiding reformatting any closed physical portion for reuse when that closed physical portion's closing-TBG is not smaller than the segment's most recently received GPA.

17. The system of claim 12, wherein the computer code includes code which, upon execution, performs the following steps:

persisting AGEs in persistent memory for respective segments;

calculating successive GPAs over time, each GPA for a given time being the minimum of the persisted AGEs of the segments at that time;

sending GPAs to the database software instance(s);

persisting GPAs in persistent memory for respective segments;

designating a segment to serve as a controller;

obtaining at the controller from other segment(s) lists of transactions which have recorded locally at the other segment(s) as being committed;

sending from the controller to the other segment(s) an aggregate list of committed transactions; and each segment committing any in-doubt transactions that appear on the aggregate list and aborting any in-doubt transactions that do not appear on the aggregate list.

18. The system of claim 12, wherein the computer code includes code which, upon execution, performs the following steps:

backing up tabular data of a segment and noting a then-current AGE as a segment-data-copy-complete-AGE;

identifying as a segment-persisted-AGE an AGE for which all transaction commit records of this segment for this AGE or prior AGEs have been written to persistent storage;

designating a segment to serve as a controller;

obtaining at the controller from other segment(s) their respective segment-data-copy-complete-AGEs;

sending from the controller to the other segment(s) a common-restore-AGE which is the maximum of the segment-data-copy-complete-AGEs; and writing each segment's transaction commit records to persistent storage until the segment's segment-persisted-AGE is not less than common-restore-AGE.

19. The system of claim 12, wherein the computer code includes code which, upon execution, performs the following steps:

designating a segment to serve as a controller;

obtaining at the controller from other segment(s) respective archived common-restore-AGEs;

verifying at the controller that all common-restore-AGEs have the same value;

redoing logged transactions at each segment up to the common-restore-AGE;

creating a harvested outcomes list at each segment, the harvested outcomes list containing outcomes from log records having a segment-persisted-AGE not greater than the common-restore-AGE; and resolving any in-doubt transactions based on the harvested outcomes list.

20. The system of claim 19, further comprising a restore checkpoint residing in memory and including at least one of the harvested outcomes lists.

\* \* \* \* \*